US012356131B2

(12) United States Patent
Lu et al.

(10) Patent No.: US 12,356,131 B2
(45) Date of Patent: Jul. 8, 2025

(54) OVER-EAR HEADPHONE

(71) Applicant: DEXIN CORPORATION, New Taipei (TW)

(72) Inventors: Ho-Lung Lu, New Taipei (TW); Hung-Yi Fan, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 234 days.

(21) Appl. No.: 17/962,793

(22) Filed: Oct. 10, 2022

(65) Prior Publication Data

US 2023/0300505 A1 Sep. 21, 2023

(30) Foreign Application Priority Data

Mar. 17, 2022 (TW) ................................. 111109748

(51) Int. Cl.
*H04R 1/10* (2006.01)

(52) U.S. Cl.
CPC .................................. *H04R 1/1008* (2013.01)

(58) Field of Classification Search
CPC .. H04R 1/1008; H04R 1/105; H04R 2420/07; H04R 1/1066; H04R 1/1075; H04R 5/0335
See application file for complete search history.

(56) References Cited

U.S. PATENT DOCUMENTS 6,006,115 A * 12/1999 Wingate .............. H04M 1/6033 379/430
6,148,446 A * 11/2000 Leight ..................... A61F 11/14 181/129
6,385,325 B1 * 5/2002 Nageno ................ H04R 5/0335 381/381
6,611,963 B2 * 9/2003 Woo ..................... H04R 5/0335 2/209
7,978,870 B2 * 7/2011 Cozens ................ H04R 1/1066 381/370
8,605,935 B1 * 12/2013 Huang ................... H04R 1/105 381/381
8,761,428 B2 * 6/2014 Amae .................. H04R 1/1066 381/378
9,226,060 B2 * 12/2015 Minarik ............... H04R 5/0335
9,301,039 B2 * 3/2016 Brunner ............... H04R 1/1066
10,334,351 B2 * 6/2019 Boyer .................. H04R 1/1083
10,341,760 B2 * 7/2019 Mann .................. H04R 1/1041

(Continued)

*Primary Examiner* — Forrest M Phillips
*Assistant Examiner* — Joseph James Peter Illicete
(74) *Attorney, Agent, or Firm* — Li & Cai Intellectual Property (USA) Office

(57) ABSTRACT

An over-ear headphone is provided, which includes a support structure, an abutting assembly, two earcup assemblies, and two speaker modules. The support structure is an arc-shaped structure and has two free ends. The abutting assembly is disposed at an inner side of the support structure, and is used for abutting against a back portion of a head of a user. Each one of the earcup assemblies is movably connected to the support structure, and is operable to move toward or away from one of the free ends. Each one of the earcup assemblies includes an earcup that is used for covering an ear of the user. The two speaker modules are disposed in the two earcup assemblies, respectively. Through a configuration of the support structure, the over-ear headphone does not affect a hairstyle of the user.

9 Claims, 14 Drawing Sheets

100

(56) References Cited

U.S. PATENT DOCUMENTS

| | | | | |
|---|---|---|---|---|
| D882,544 | S * | 4/2020 | Paterson | D14/205 |
| 2011/0135137 | A1 * | 6/2011 | Chung | H04R 1/1066<br>381/386 |
| 2013/0343591 | A1 * | 12/2013 | Brunner | H04R 1/1075<br>381/371 |
| 2022/0086559 | A1 * | 3/2022 | Belanger | H04R 1/2842 |

* cited by examiner

OVER-EAR HEADPHONE

CROSS-REFERENCE TO RELATED PATENT APPLICATION

This application claims the benefit of priority to Taiwan Patent Application No. 111109748, filed on Mar. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a headphone, and more particularly to an over-ear headphone.

BACKGROUND OF THE DISCLOSURE

Reference is made to FIG. 1, which is a schematic view showing a user wearing a conventional over-ear headphone from a different perspective. A conventional over-ear headphone E includes a support structure E1 and two earcup assemblies E2. Two ends of the support structure E1 are connected to the two earcup assemblies E2, respectively. When the user wears the conventional over-ear headphone E, the support structure E1 spans a top portion of the head of the user. As a result, the support structure E1 abuts and presses against the hair of the user.

Reference is made to FIG. 2, which is a top view showing the head of a user having a flat head syndrome. Such a user cannot wear the conventional over-ear headphone E since his/her two ears U1, U2 are not situated on a same horizontal line HZ.

SUMMARY OF THE DISCLOSURE

In response to the above-referenced technical inadequacies, the present disclosure provides an over-ear headphone, which can overcome issues associated with a conventional over-ear headphone. When a user wears the conventional over-ear headphone, a support structure of said over-ear headphone may abut and press against the hair on a top portion of a head of the user. In addition, a user having a flat head syndrome is not able to wear the conventional over-ear headphone.

In one aspect, the present disclosure provides an over-ear headphone, which includes a support structure, an abutting assembly, two earcup assemblies, and two speaker modules. The support structure is an arc-shaped structure and has two free ends. The abutting assembly is disposed at an inner side of the support structure, and is used for abutting against a back portion of a head of a user. Each one of the earcup assemblies is movably connected to the support structure, and is operable to move toward or away from one of the free ends. Each one of the earcup assemblies includes an earcup that is used for covering an ear of the user. The two speaker modules are disposed in the two earcup assemblies, respectively.

Therefore, when the user wears the over-ear headphone of the present disclosure, the support structure is positioned at the back portion of the head of the user, and does not abut and press against the top portion of the head of the user. Accordingly, the support structure does not abut and press against the hair of the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
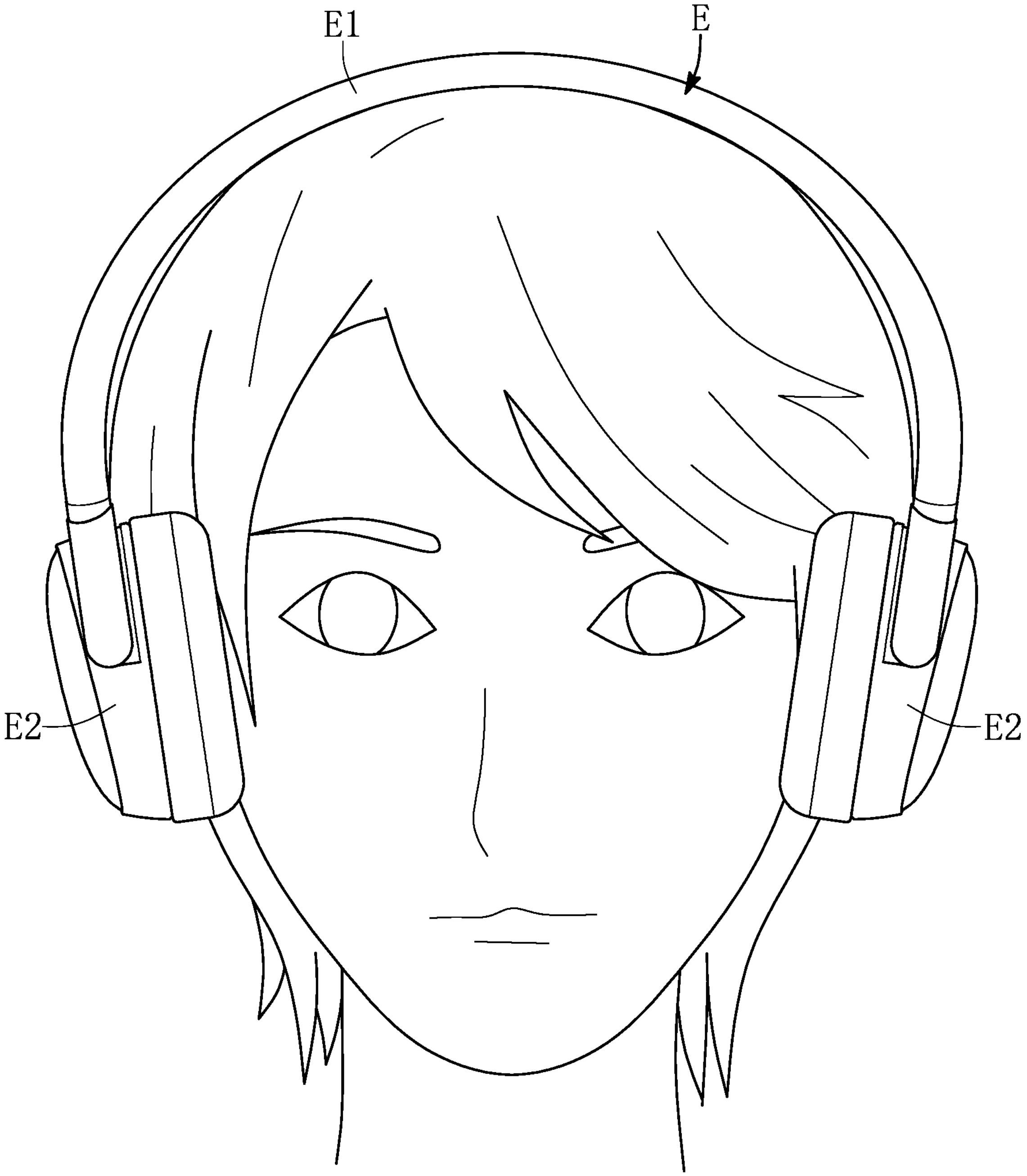
FIG. 1 PRIOR ART
FIG. 1 is a front view showing a user wearing a conventional over-ear headphone.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
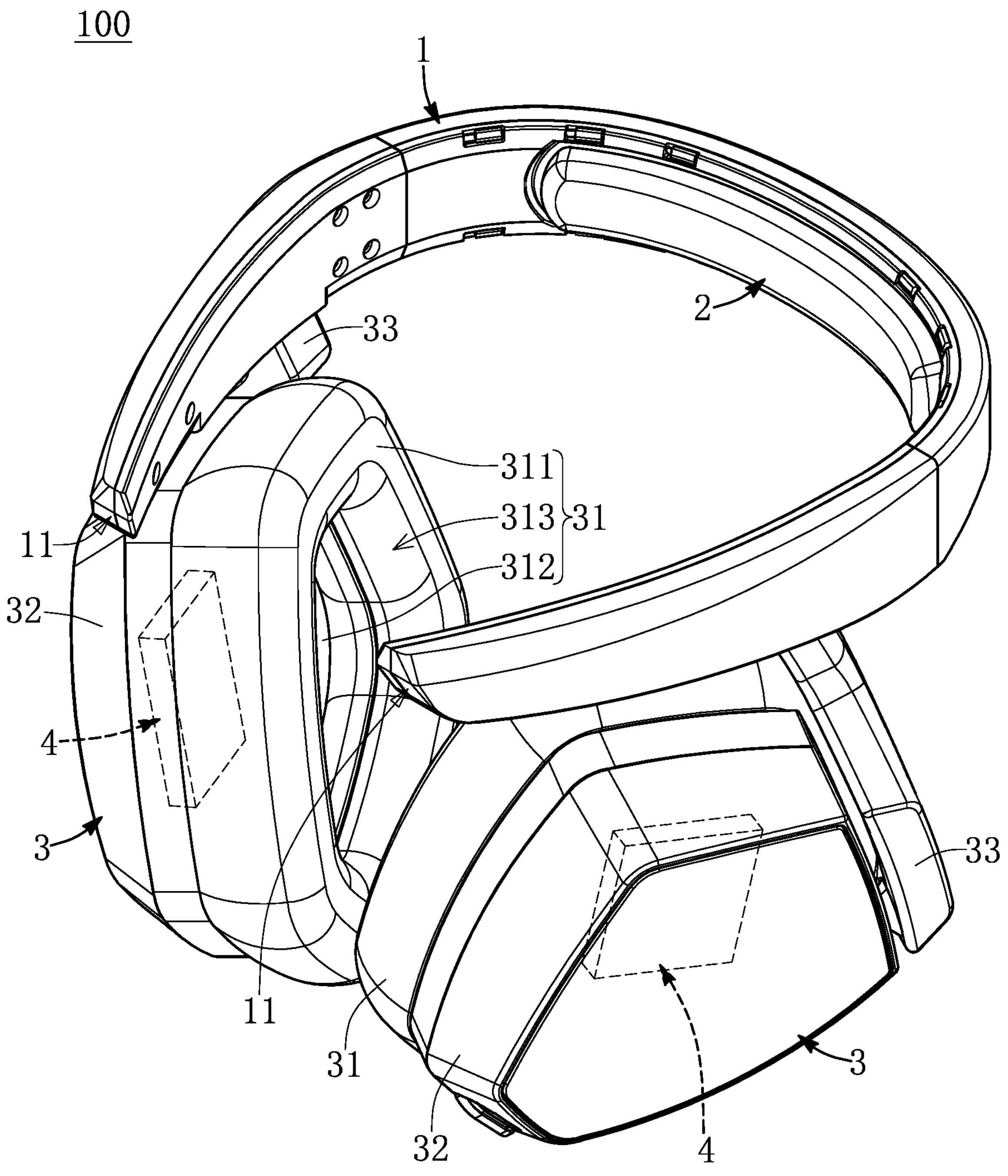
FIG. 3 is a schematic view of an over-ear headphone according to the present disclosure.
Figure 4:
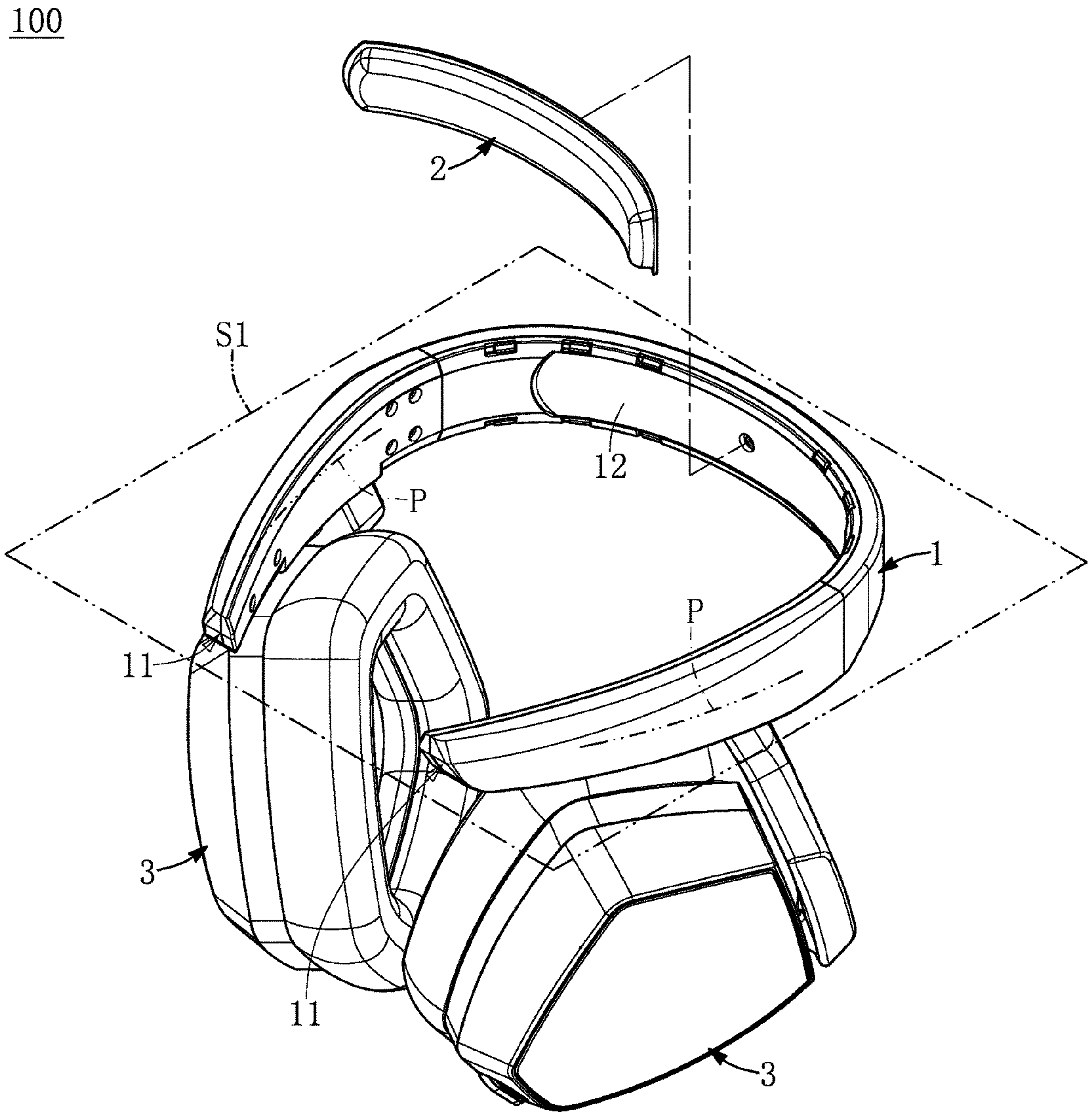
FIG. 4 is a schematic partially exploded view of the over-ear headphone according to the present disclosure.
Figure 5:
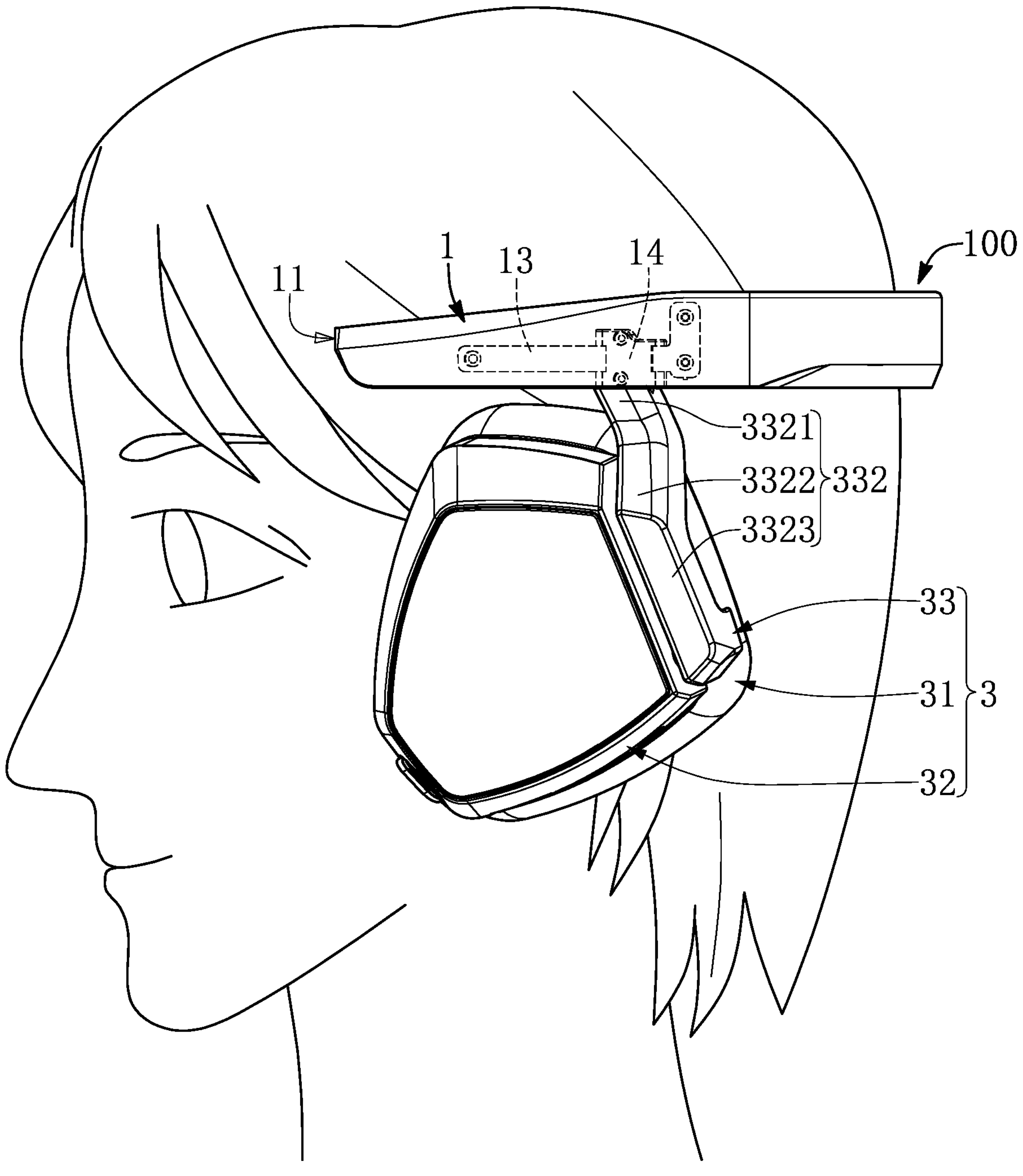
FIG. 5 is a schematic side view showing the user wearing the over-ear headphone according to the present disclosure.

Referring to FIG. 3 to FIG. 5, FIG. 3 is a schematic view of an over-ear headphone according to the present disclosure, FIG. 4 is a schematic partially exploded view of the over-ear headphone according to the present disclosure, and FIG. 5 is a schematic side view showing a user wearing the over-ear headphone according to the present disclosure. An over-ear headphone 100 of the present disclosure includes a support structure 1, an abutting assembly 2, two earcup assemblies 3, and two speaker modules 4. The support structure 1 is an arc-shaped structure and has two free ends 11.

An abutting portion 12 is disposed at a substantially center position of an inner side of the support structure 1, and the abutting assembly 2 is fixedly disposed at the abutting portion 12. In practical application, the abutting portion 12 can, for example, have a groove shape. In practical use, the abutting assembly 2 can, for example, include an elastic structure (such as that of foam or elastic rubber), but the present disclosure is not limited thereto.

In practical use, the support structure 1 can be elastic. When a user wears the over-ear headphone 100 of the present disclosure, the support structure 1 can be operated to slightly extend in an outward direction before the over-ear headphone 100 is placed onto his/her head. In this way, when the user wears the over-ear headphone 100 on the head, an elastic restoring force generated by operating the support structure 1 allows the two earcup assemblies 3 to be fixedly retained at two sides of the head of the user, thereby enhancing wearing stability of the over-ear headphone 100.

Each one of the earcup assemblies 3 is movably connected to the support structure 1, and is disposed adjacent to one of the free ends 11. Further, each one of the earcup assemblies 3 is operable to move toward or away from the adjacent free end 11.

The two speaker modules 4 are disposed in the two earcup assemblies 3, respectively. In practical application, each speaker module 4 includes all necessary electronic components for playing audio signals (e.g., a speaker, a circuit board, a microprocessor, a BLUETOOTH® chip module, a battery, and a port).

As shown in FIG. 4, a reference plane S1 is jointly defined by the two free ends 11 and the abutting portion 12 of the support structure 1. When each one of the earcup assemblies 3 is being operated, a portion of the earcup assembly 3 moves along a sliding path P in a direction toward or away from an adjacent one of the free ends 11 relative to the reference plane S1. Here, the sliding path P is positioned on the reference plane S1.

As shown in FIG. 5, when the user wears the over-ear headphone 100 of the present disclosure, the abutting assembly 2 correspondingly abuts against a back portion of the head of the user, and the overall support structure 1 is positioned along a horizontal direction of the head of the user (i.e., a front-and-back direction of the head of the user). Since the support structure 1 does not abut and press against a top portion of the head of the user, the over-ear headphone 100 of the present disclosure does not negatively affect a hairstyle on the top portion of the head of the user.

According to the above, when each one of the earcup assemblies 3 is being operated to move relative to the support structure 1, the earcup assembly 3 moves toward or away from the back portion of the head of the user. In this way, according to the shape of the head and positions of two ears, the user can adjust and move the two earcup assemblies 3 to proper locations.

Figure 2:
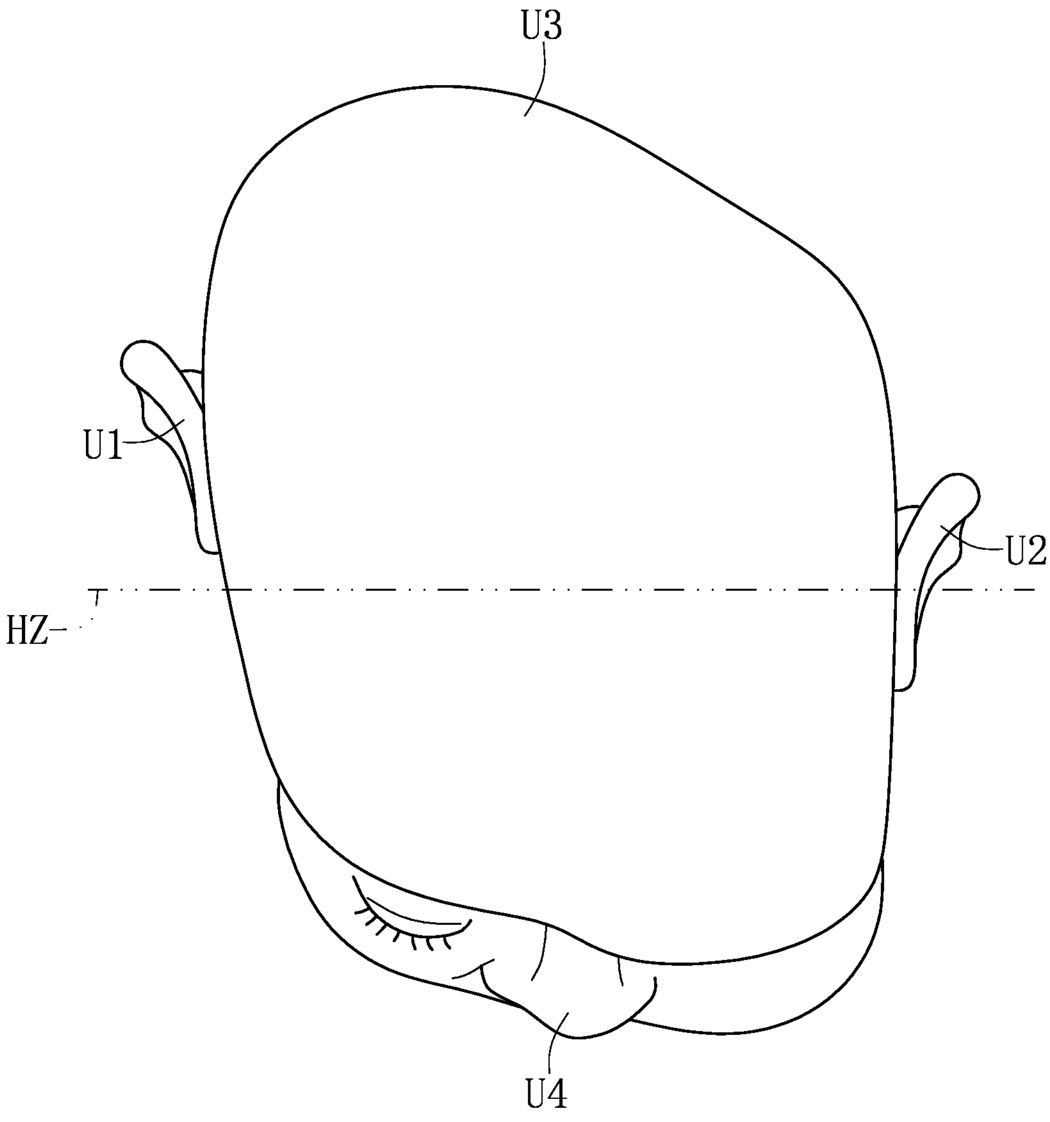
FIG. 2 RELATED ART
FIG. 2 is a top view showing a head of a user having a flat head syndrome.

It should be noted that positions of two ears U1, U2 of a user with a flat head syndrome may be as illustrated in FIG. 2. That is, the ear U1 is closer to a back portion U3 of the head of the user, and the ear U2 is closer to a nose U4 of the user. The two ears U1, U2 are not situated on a same horizontal line HZ.

Two earcup assemblies E2 of a conventional over-ear headphone E cannot be operated to move toward or away from the back portion of the head of the user. In addition, a support structure E1 of the conventional over-ear headphone E cannot be twisted. As such, if the user having the flat head syndrome wishes to cover the ears U1, U2 with the two earcup assemblies E2, the support structure E1 will be twisted to an extent that risks breakage thereof. Moreover, the user may even be unable to cover the ears U1, U2 with the two earcup assemblies E2. Therefore, the conventional over-ear headphone E is clearly unsuitable for users that have different head shapes, especially for those with the flat head syndrome.

Conversely, when the user wears the over-ear headphone 100 of the present disclosure (as shown in FIG. 3 to FIG. 6), the back portion of the head of the user corresponds in position to a location of the support structure 1 at which the abutting assembly 2 is disposed. Further, in the over-ear headphone 100 provided by the present disclosure, each one of the earcup assemblies 3 is movably connected to the support structure 1, and the user can operate the earcup assembly 3 according to practical requirements, such that any one of the earcup assemblies 3 moves forward (i.e., away from the back portion of the head) or backward (i.e., toward the back portion of the head) relative to the head of the user. Accordingly, the over-ear headphone 100 of the present disclosure can be worn by the user having the flat head syndrome.

Figure 6:
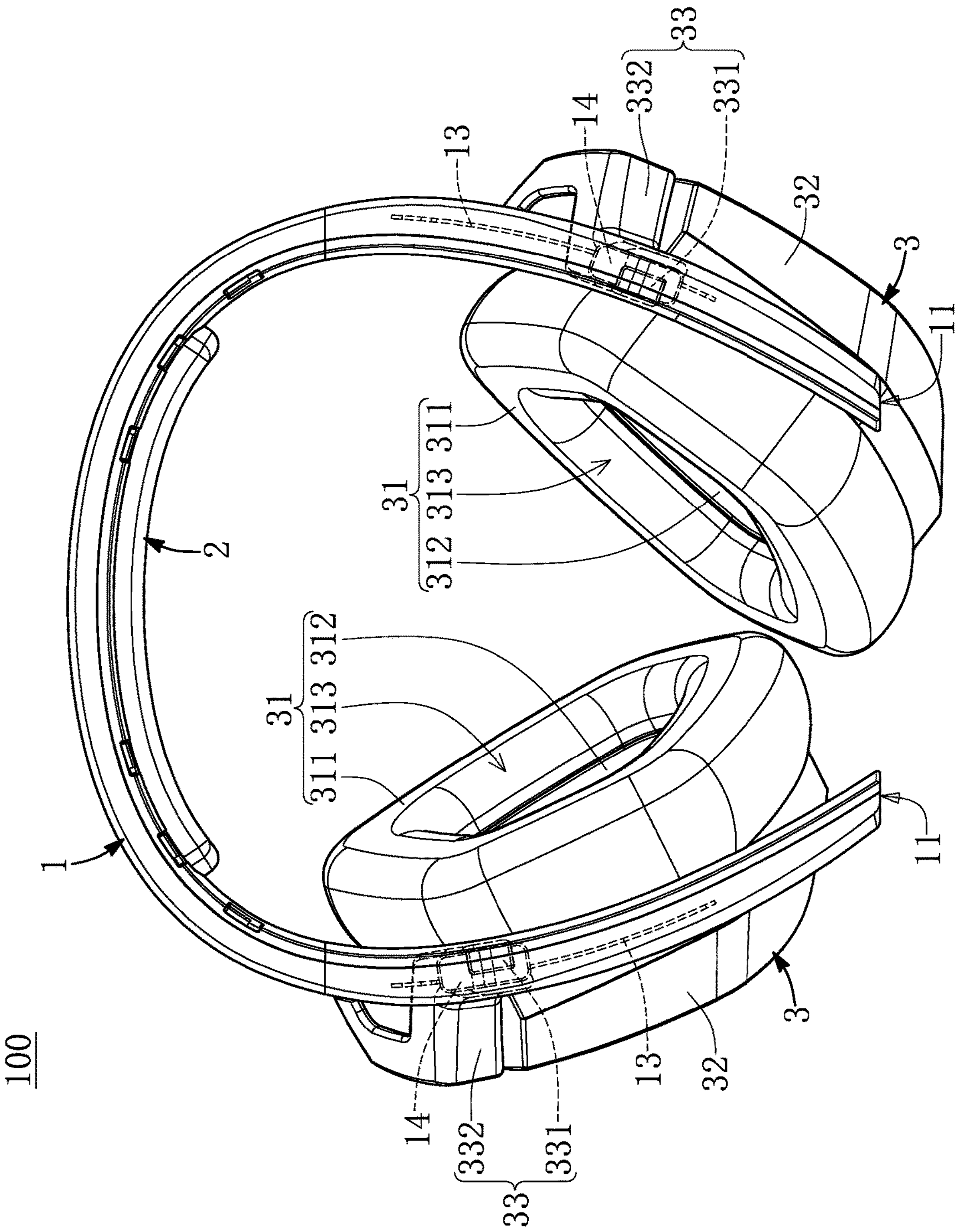
FIG. 6 is a schematic top view of two adjusted earcup assemblies of the over-ear headphone according to the present disclosure.

More specifically, when the user having the flat head syndrome (as shown in FIG. 2) wears the over-ear headphone 100 of the present disclosure, the user can separately adjust positions of the two earcup assemblies 3 relative to the support structure 1, such that the over-ear headphone 100 is configured as illustrated in FIG. 6. In this way, the two earcup assemblies 3 can properly cover the two ears of the user.

Figure 7:
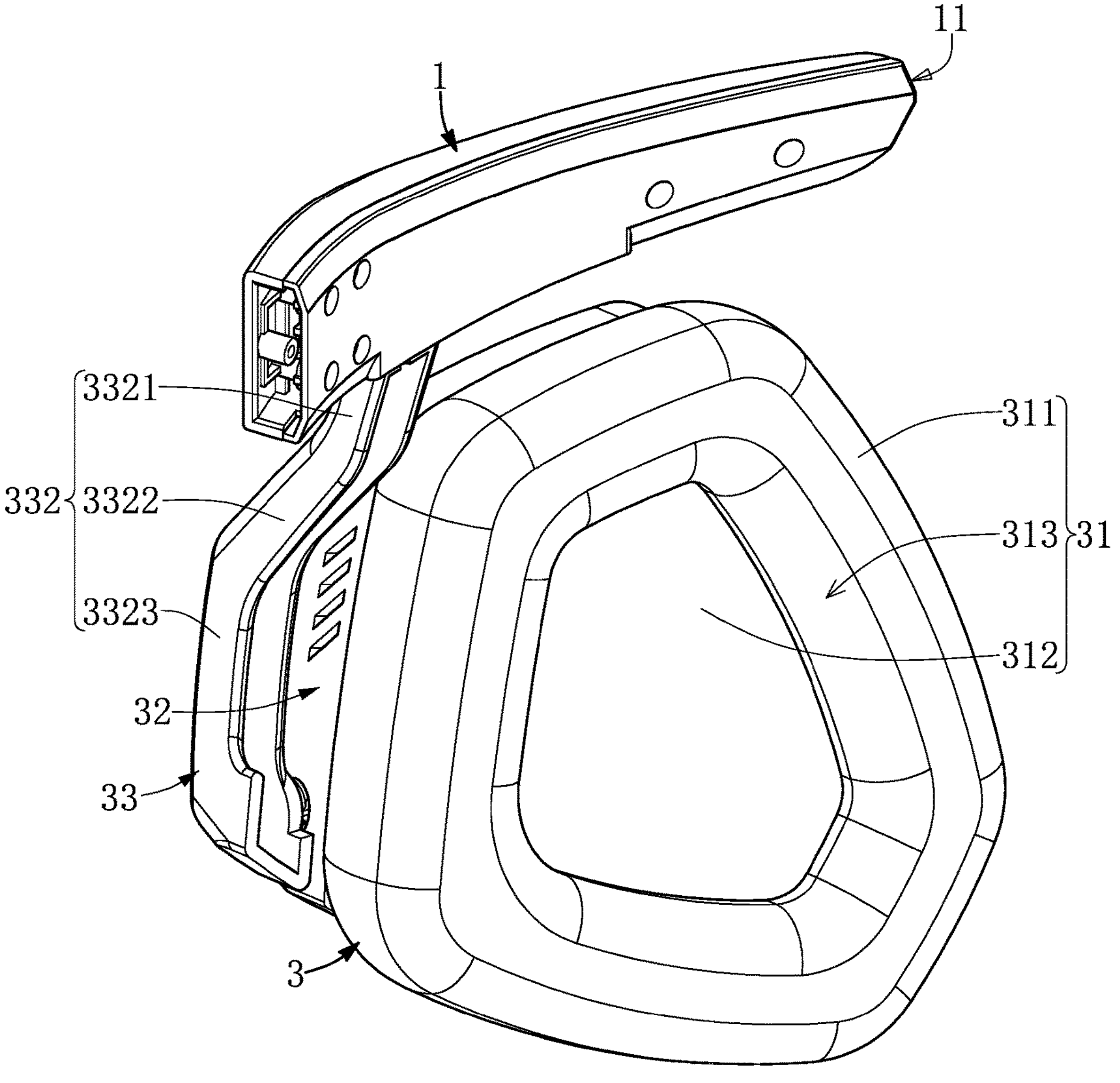
FIG. 7 is a schematic view of a partial support structure and one of the earcup assemblies of the over-ear headphone according to the present disclosure.
Figure 8:
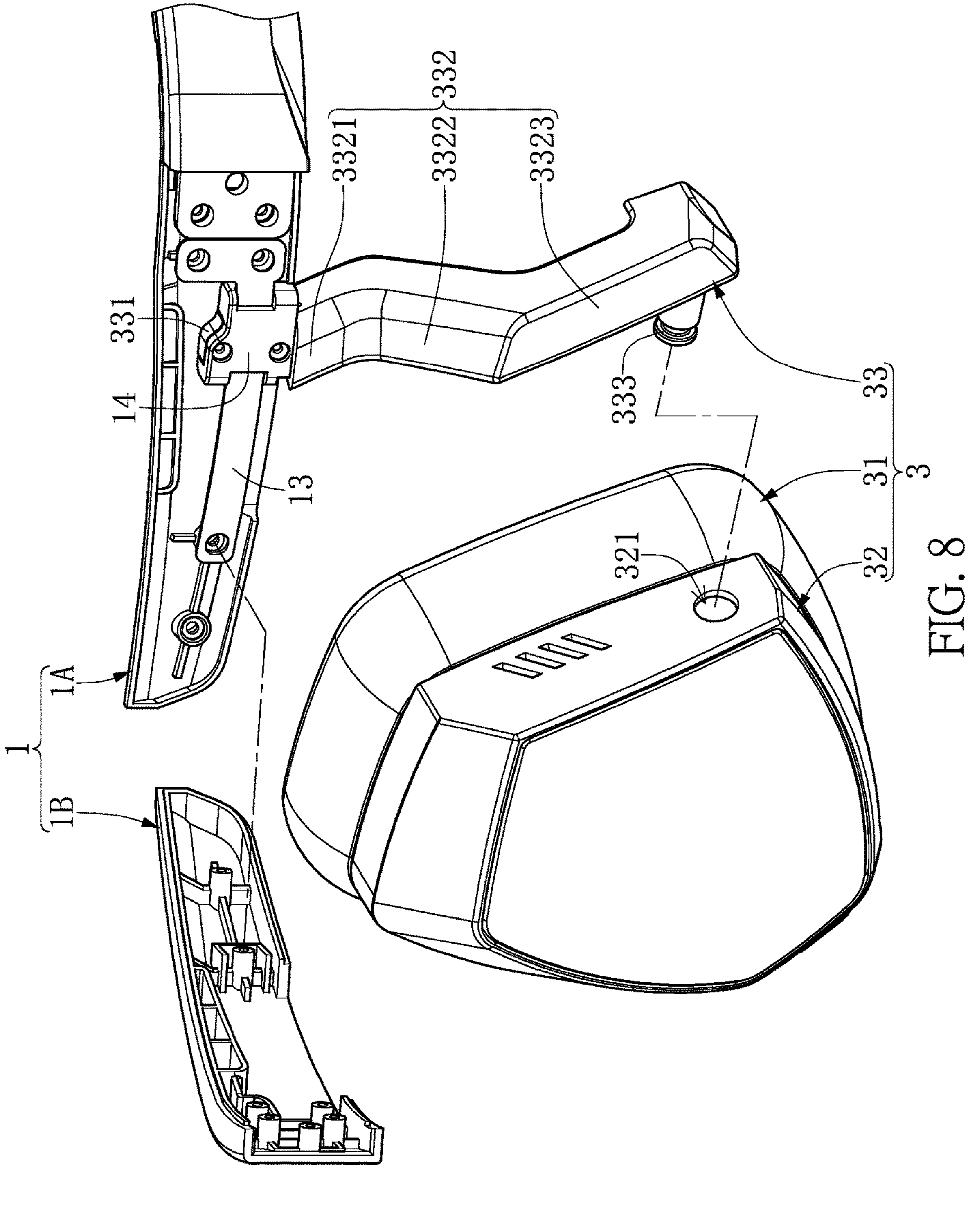
FIG. 8 and FIG. 9 are each a schematic exploded view of different partial components of the over-ear headphone according to the present disclosure.
Figure 9:
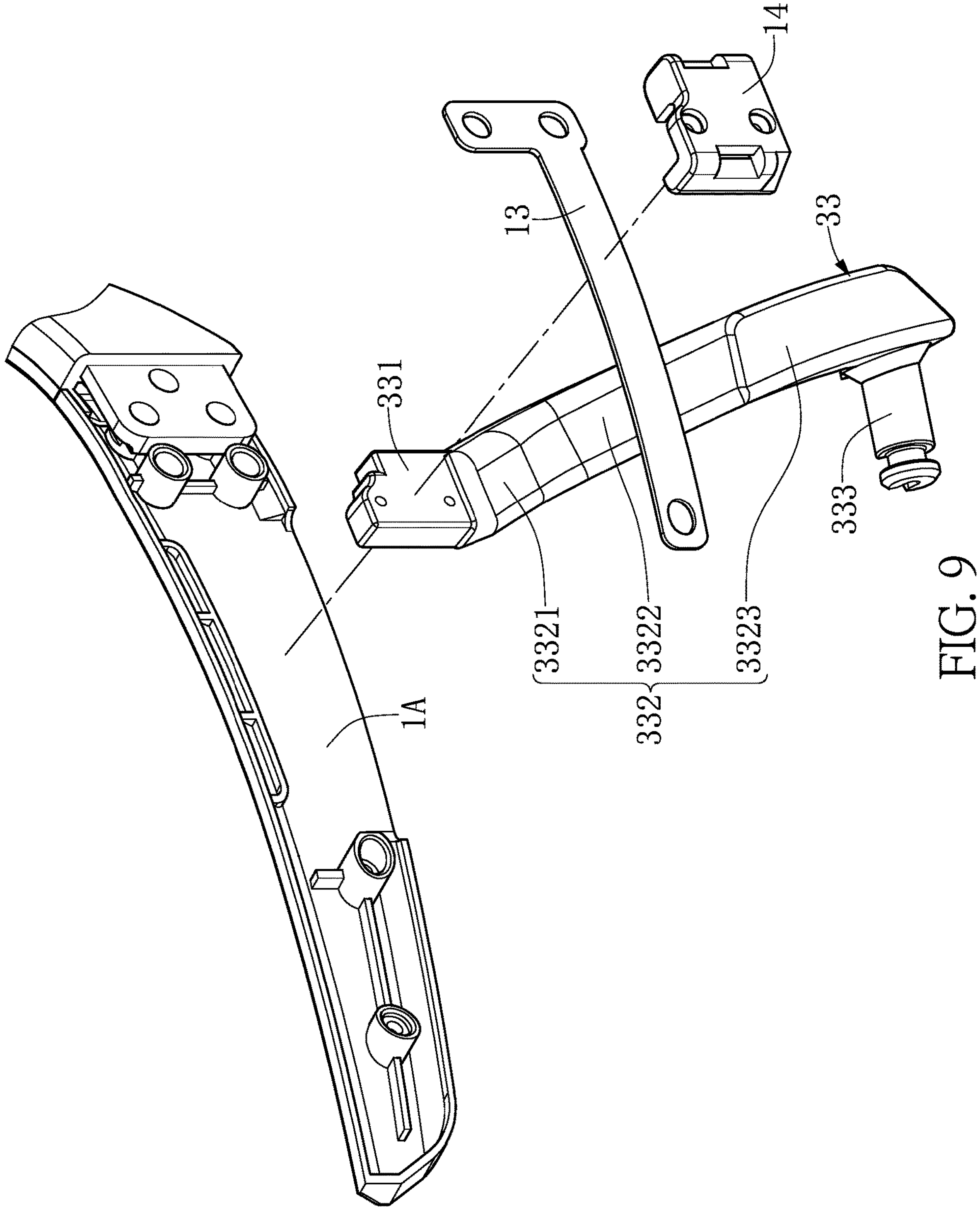
Figure 10:
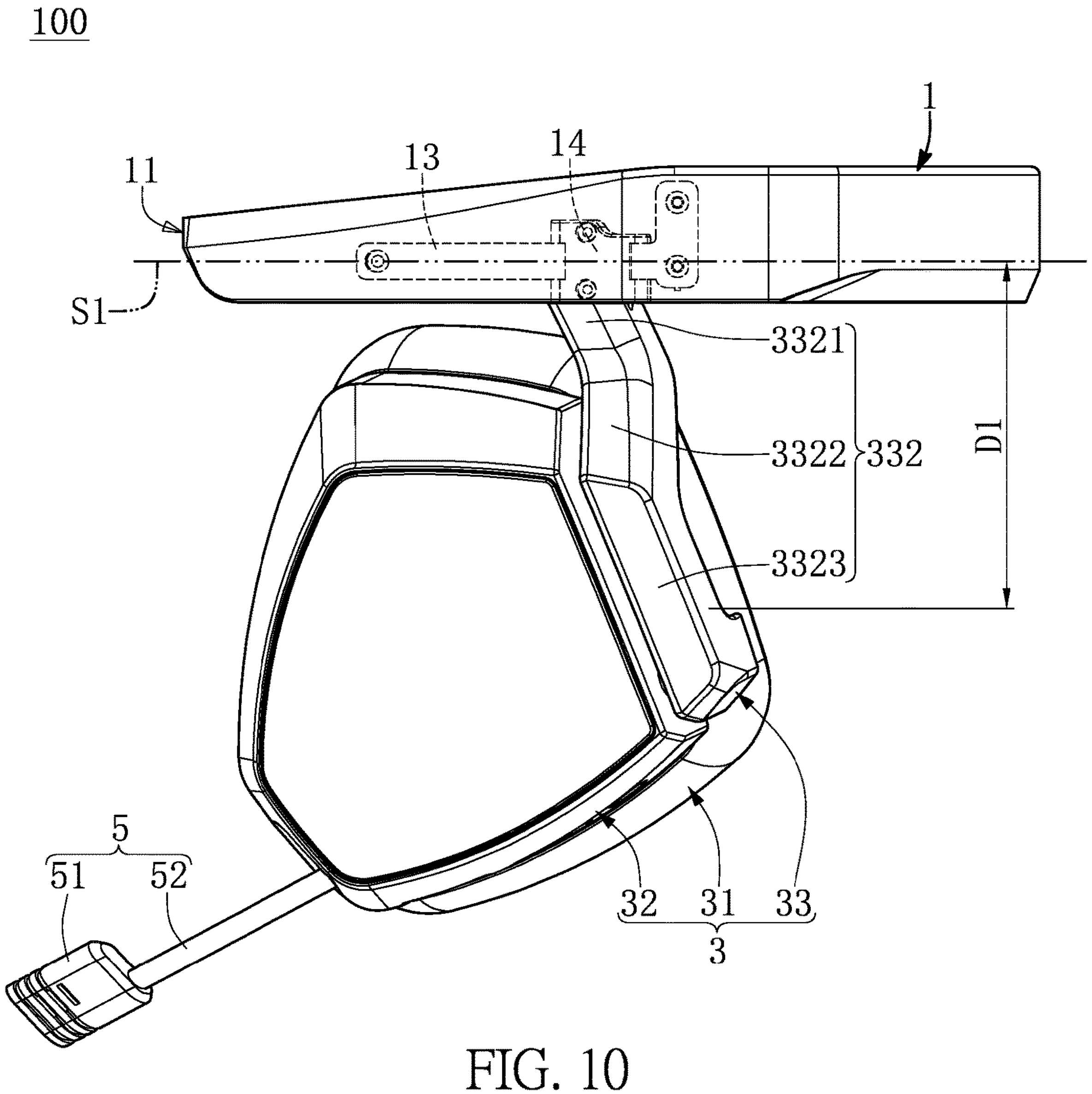
FIG. 10 and FIG. 11 are two different side views of the over-ear headphone according to the present disclosure.
Figure 11:
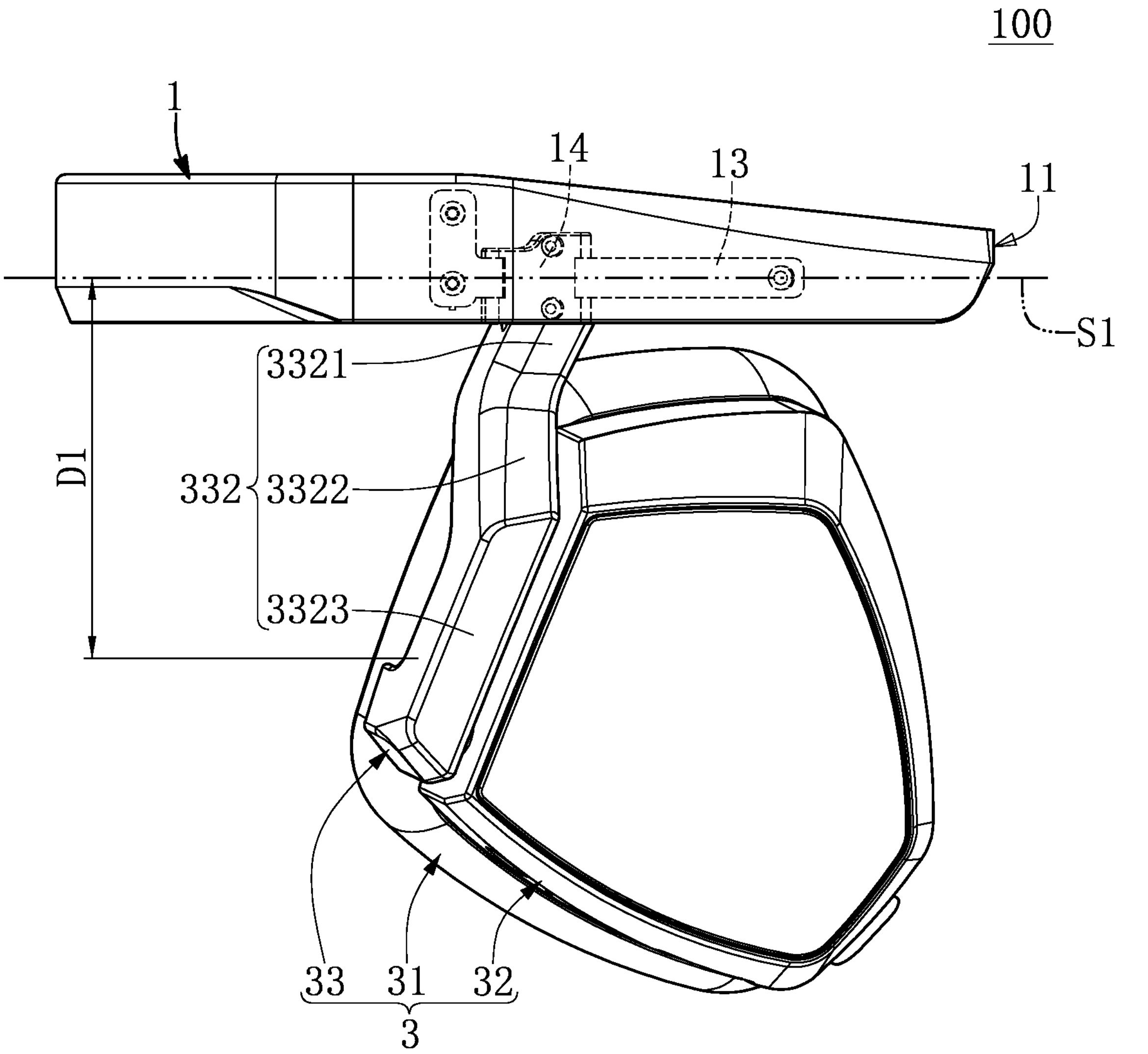

Reference is made to FIG. 6 to FIG. 11. FIG. 7 is a schematic view of a partial support structure and one of the earcup assemblies of the over-ear headphone according to the present disclosure. FIG. 8 and FIG. 9 are each a schematic exploded view of different partial components of the over-ear headphone according to the present disclosure. FIG. 10 and FIG. 11 are two different side views of the over-ear headphone according to the present disclosure.

Each one of the earcup assemblies 3 includes an earcup 31, a housing 32, and a movable arm 33. The earcup 31 has an annular portion 311 and a bottom portion 312. The annular portion 311 is disposed around a periphery of the bottom portion 312 in a surrounding manner, and a recess 313 is jointly formed by the annular portion 311 and the bottom portion 312. The recess 313 is used for accommodating the ear of the user, and the annular portion 311 and the bottom portion 312 are jointly used for covering the ear of the user. The earcup 31 is fixed at one side of the housing 32, and the moveable arm 33 is pivotally connected to the housing 32. The housing 32 is operable to rotate toward or away from another one of the earcup assemblies 3 relative to the movable arm 33.

More specifically, the movable arm 33 includes a connecting portion 331, an exposed portion 332, and a pivot portion 333. The support structure 1 can include a main body 1A and a plurality of covers 1B, and the cover 1B is detachably fixed to the main body 1A. Two slide rails 13 are fixedly disposed onto the main body 1A. Each slide rail 13 is arranged between the main body 1A and the cover 1B, and is not exposed outside the support structure 1. Further, the two slide rails 13 are disposed adjacent to the two free ends 11 of the support structure 1, respectively. Each slide rail 13 can be an arc-shaped sheet structure. A bending degree of the arc-shaped sheet structure can be designed according to an overall appearance of the support structure 1.

The support structure 1 can further include two sliding blocks 14. Each sliding block 14 is connected to the connecting portion 331 of one movable arm 33, and the slide rail 13 is jointly retained by the sliding block 14 and the connecting portion 331. The movable arm 33 is able to move along the sliding path P (as shown in FIG. 4) of the slide rail 13. In other words, the movable arm 33 is operable to move toward or away from the adjacent free end 11 along the corresponding sliding path P (as shown in FIG. 4). It should be noted that how the movable arm 33 is connected to the slide rail 13 is not limited by the drawings or the descriptions provided above. As long as the movable arm 33 is able to move along the slide rail 13, how the movable arm 33 is connected to the slide rail 13 can be changed according to practical requirements.

When one of the earcup assemblies 3 is operated to move toward the adjacent free end 11, said earcup assembly 3 may gradually move toward another one of the earcup assemblies 3 (as shown in FIG. 6). Through this configuration, when the positions of the earcup assemblies 3 are being adjusted, it can be ensured that the earcups 31 fit the head of the user as much as possible regardless of adjustments to their positions. This is because the head shape of most people gradually becomes smaller from the two sides along a forward direction.

The exposed portion 332 of the movable arm 33 is not disposed in the support structure 1, but is directly exposed outside (that is, it can be directly observed by the naked eye). One end of the exposed portion 332 is connected to the connecting portion 331, and the pivot portion 333 is formed by another end of the exposed portion 332 extending toward the free end 11.

The pivot portion 333 is pivotally connected to the housing 32, and one of the housings 32 is operable to rotate toward or away from another one of the housings 32 relative to the movable arm 33. For example, the pivot portion 333 can be a structure having a shape similar to a cylinder, and a corresponding pivot structure (not shown) is disposed inside the housing 32. The housing 32 has a through hole 321 that corresponds in position to the pivot structure, and the pivot portion 333 is connected to the pivot structure through the through hole 321. Through a configuration in which the housing 32 can be operated to rotate toward another one of the earcup assemblies 3 relative to the connected movable arm 33, when the over-ear headphone 100 is worn, each one of the earcup assemblies 3 is rotatable according to the head shapes of different users. In this way, the earcup assemblies 3 can be better attached to the two sides of the head of the user, thereby improving a wearing experience of the user and allowing the user to obtain an enhanced listening experience.

Reference is made to FIG. 10 and FIG. 11. In one exemplary embodiment, a shortest vertical distance D1 between the movable arm 33 and the reference plane S1 is gradually increased from the one end of the exposed portion 332 that is connected to the connecting portion 331 to the another end of the exposed portion 332, and the exposed portion 332 is obliquely disposed in a direction away from an adjacent one of the free ends 11. This configuration allows related personnel to operate the earcup assemblies 3 more easily, such that the earcup assemblies 3 can be easily operated to move relative to the adjacent free end 11.

Reference is made to FIG. 10. It is worth mentioning that, in one embodiment, the over-ear headphone 100 can further include a microphone assembly 5. The microphone assembly 5 includes a sound receiver 51 and a connecting arm 52, the sound receiver 51 is disposed at one end of the connecting arm 52, and another end of the connecting arm 52 is fixed within the housing 32. At least one portion of the microphone assembly 5 is operable to be received within the housing 32 of the connected earcup assembly 3. Preferably, when the microphone assembly 5 is received within the housing 32, only a terminal portion of the sound receiver 51 is exposed from the housing 32, and the sound receiver 51 is mostly received within the housing 32.

Figure 12:
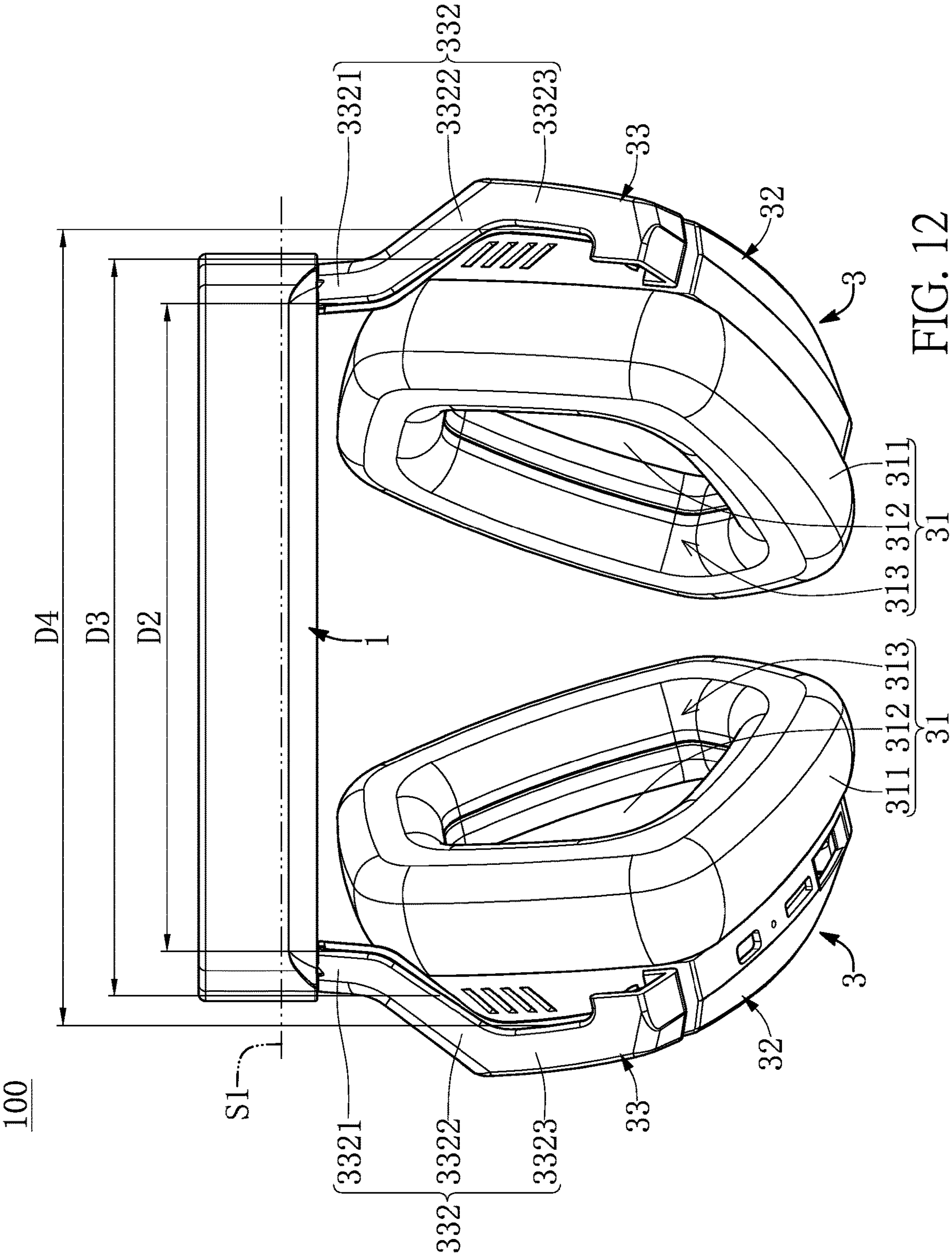
FIG. 12 is a rear view of the over-ear headphone according to the present disclosure.
Figure 13:
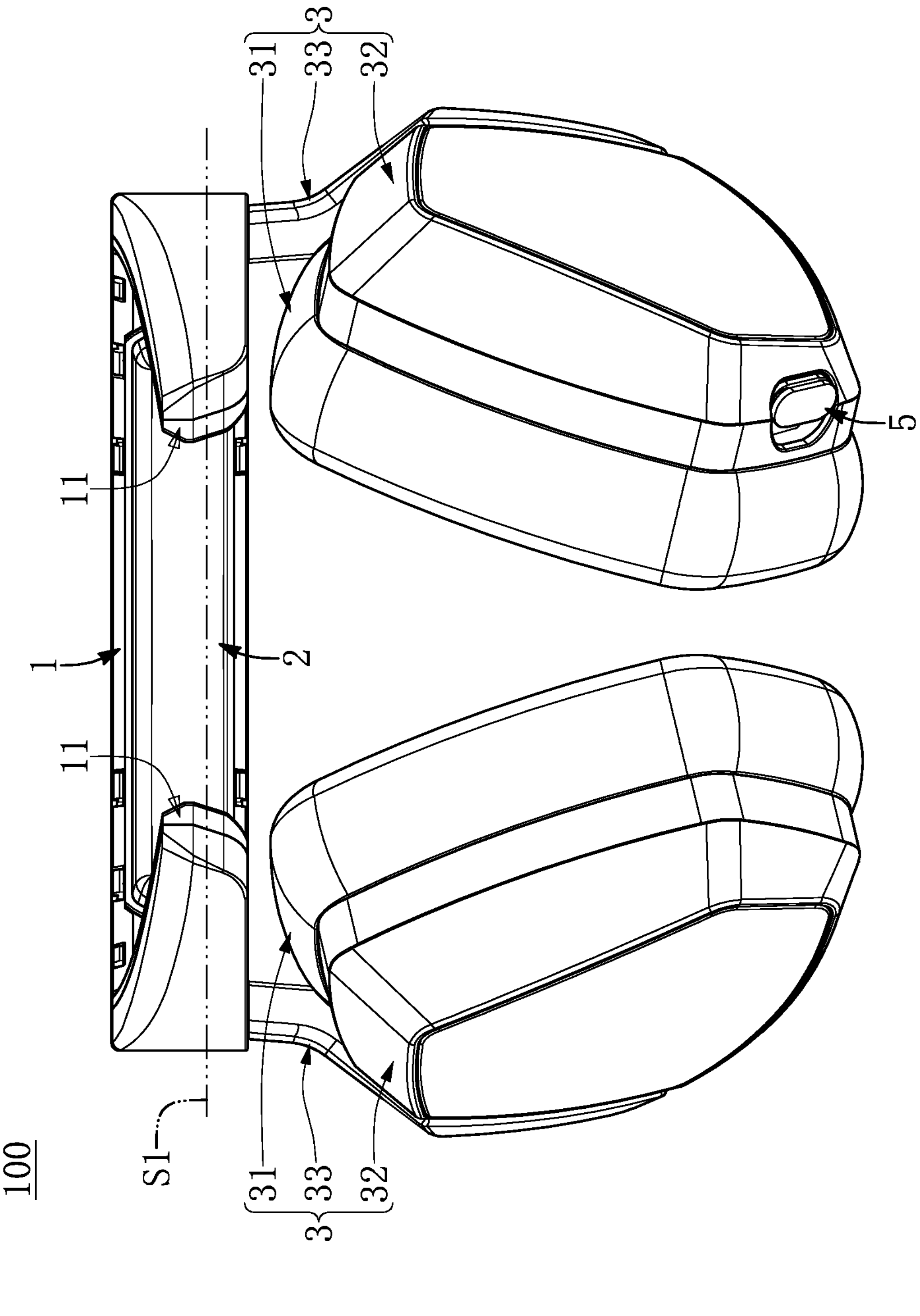
FIG. 13 is a front view of the over-ear headphone according to the present disclosure.

Reference is made to FIG. 10 to FIG. 13, in which FIG. 12 is a rear view of the over-ear headphone according to the present disclosure, and FIG. 13 is a front view of the over-ear headphone according to the present disclosure. In one exemplary embodiment, the exposed portion 332 has a first section 3321, a second section 3322, and a third section 3323. One end of the second section 3322 is connected to one end of the first section 3321, another end of the second section 3322 is connected to one end of the third section 3323, another end of the first section 3321 is connected to the connecting portion 331, and another end of the third section 3323 is a terminal end that extends toward one side to be formed into the pivot portion 333.

A distance D2 between the two first sections 3321 slightly decreases along a direction from the one end of the first section 3321 that is adjacent to the second section 3322 to the another end of the first section 3321 that is distant from the second section 3322. A distance D3 between the two second sections 3322 gradually increases along a direction from the one end of the second section 3322 that is adjacent to the first section 3321 to the another end of the second section 3322 that is adjacent to the third section 3323. A distance D4 between the two third sections 3323 gradually decreases along a direction from the one end of the third section 3323 that is adjacent to the second section 3322 to the terminal end of the third section 3323.

A distance defined between the two bottom portions 312 of the two earcups 31 of the two earcup assemblies 3 is gradually decreased from one side that is adjacent to the abutting assembly 2 to another side that is distant from the abutting assembly 2. The earcup assemblies 3 are each obliquely disposed.

According to the above, since a width of the head of most users is gradually decreased along a forward direction from the back portion of the head, a fitting degree between the two earcup assemblies 3 and the two sides of the head of the user can be significantly increased due to configurations of the above-mentioned exposed portion 332 and the earcup assembly 3. Accordingly, the listening experience of the user can be further enhanced.

Figure 14:
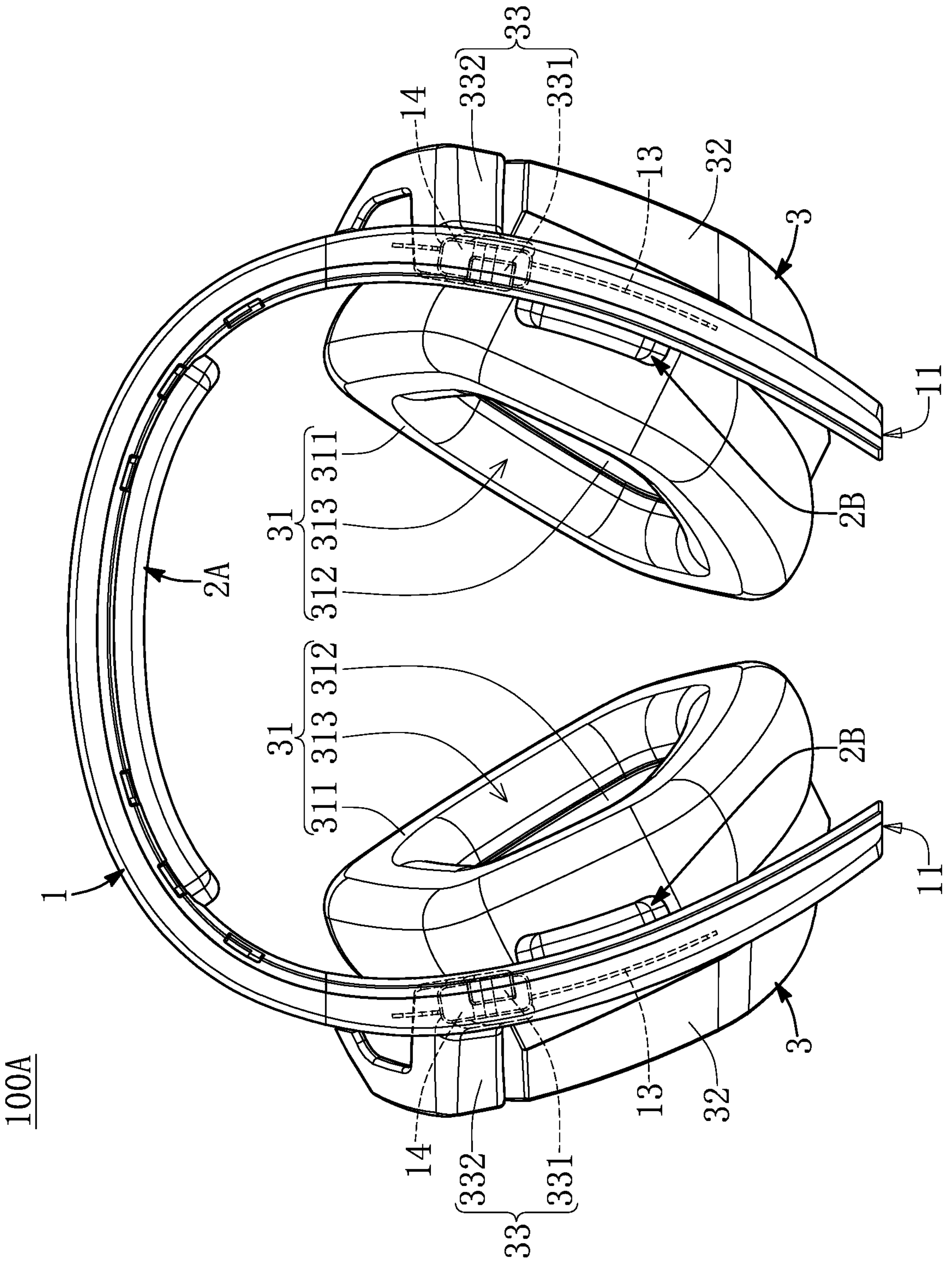
FIG. 14 is a top view of the over-ear headphone according to another embodiment of the present disclosure.

Reference is made to FIG. 14, which is a top view of the over-ear headphone according to another embodiment of the present disclosure. The main difference between the present embodiment and the previous embodiment is that an over-ear headphone 100A includes three abutting assemblies, which are respectively defined as a center abutting assembly 2A and two side abutting assemblies 2B. The center abutting assembly 2A is disposed adjacent to a center position of the support structure 1, and the two side abutting assemblies 2B are disposed adjacent to the two free ends of the support structure 1, respectively.

In the present embodiment, when the over-ear headphone 100A is worn on the head of the user, the back portion of the head of the user abuts against the center abutting assembly 2A, and the two sides (i.e., a left side and a right side) of the head of the user abut against the two side abutting assemblies 2B. In this way, the wearing comfort of the user can be further improved.

In conclusion, when the over-ear headphone of the present disclosure is worn on the head of the user, the support structure of the over-ear headphone is positioned at the back portion of the head of the user, and does not abut and press against the hair on the top portion of the head of the user. Accordingly, the hairstyle of the user will not be affected by the over-ear headphone.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An over-ear headphone, comprising:

a support structure, wherein the support structure is an arc-shaped structure and has two free ends; wherein the support structure includes a main body, a plurality of covers, and two slide rails, the covers are detachably fixed to the main body, the two slide rails are fixedly disposed onto the main body, and each of the slide rails is arranged between the main body and the cover, so that each of the slide rails is enclosed within the support structure;

an abutting assembly, wherein the abutting assembly is disposed at an inner side of the support structure and configured to abut against a back portion of a head of a user;

two earcup assemblies, wherein each one of the earcup assemblies is movably connected to the slide rail of the support structure, and is operable to move toward or away from one of the free ends; wherein each one of the earcup assemblies includes;

an earcup that is used for covering an ear of the user;

a housing having an inner side, an outer side opposite to the inner side, and a surrounding lateral side that is connected between the inner side and the outer side, wherein the earcup is fixed at the inner side of the housing, and the surrounding lateral side of the housing has a through hole arranged adjacent to a peripheral surface of the earcup; and a movable arm, wherein one end of the movable arm is pivotally connected to the housing by inserting into the through hole, and another end of the moveable arm is movably connected to one of the side rails; and two speaker modules disposed in the housings of the two earcup assemblies, respectively.

2. The over-ear headphone according to claim 1, wherein the support structure further includes an abutting portion, the abutting assembly is disposed at the abutting portion, and a reference plane is jointly defined by the two free ends and the abutting portion; wherein, when each one of the earcup assemblies is being operated, a portion of the earcup assembly moves toward or away from one of the free ends relative to the reference plane.

3. The over-ear headphone according to claim 2, wherein the support structure includes two slide rails, and each one of the slide rails is disposed adjacent to one of the free ends; wherein, when each one of the earcup assemblies is being operated, a portion of the movable arm is able to move toward or away from one of the free ends along a sliding path of the slide rail; wherein the two sliding paths are positioned on the reference plane; wherein, when one of the earcup assemblies moves toward the adjacent free end along the sliding path, the one of the earcup assemblies gradually moves toward another one of the earcup assemblies.

4. The over-ear headphone according to claim 3, wherein the slide rail is an arc-shaped sheet structure, wherein the movable arm includes a connecting portion, the arc-shaped sheet structure is jointly clamped by the connecting portion and a sliding block, and the connecting portion and the sliding block are able to slide along the arc-shaped sheet structure.

5. The over-ear headphone according to claim 4, wherein the movable arm further includes an exposed portion and a pivot portion, one end of the exposed portion is connected to the connecting portion, and the pivot portion is formed by another end of the exposed portion extending toward the free end; wherein the connecting portion is disposed inside the support structure, the pivot portion is pivotally connected to the housing, and one of the housings is operable to rotate toward or away from another one of the housings relative to the movable arm.

6. The over-ear headphone according to claim 5, wherein a shortest vertical distance between the movable arm and the reference plane is gradually increased from the one end of the exposed portion that is connected to the connecting portion to the other end of the exposed portion, and the exposed portion is obliquely disposed in a direction away from an adjacent one of the free ends.

7. The over-ear headphone according to claim 5, wherein the exposed portion has a first section, a second section, and a third section; wherein one end of the second section is connected to one end of the first section, another end of the second section is connected to one end of the third section, another end of the first section is connected to the connecting portion, and another end of the third section is a terminal end that is connected to the pivot portion; wherein a distance between the two second sections gradually increases along a direction from the one end of the second section that is adjacent to the first section to the another end of the second section that is adjacent to the third section; wherein a distance between the two third sections gradually decreases along a direction from the one end of the third section that is adjacent to the second section to the terminal end of the third section.

8. The over-ear headphone according to claim 3, further comprising a microphone assembly, wherein the microphone assembly includes a sound receiver and a connecting arm, the sound receiver is disposed at one end of the connecting arm, and another end of the connecting arm is fixed within the housing; wherein at least one portion of the microphone assembly is operable to be received within the housing of the connected earcup assembly.

9. The over-ear headphone according to claim 1, wherein a quantity of the abutting assembly included in the over-ear headphone is three, and the three abutting assemblies are respectively defined as a center abutting assembly and two side abutting assemblies; wherein the center abutting assembly is disposed adjacent to a center position of the support structure, and the two side abutting assemblies are disposed adjacent to the two free ends of the support structure, respectively; wherein, when the over-ear headphone is worn on the head of the user, the back portion of the head of the user abuts against the center abutting assembly, and a left side and a right side of the head of the user abut against the two side abutting assemblies.

* * * * *